(12) United States Patent
Martin et al.

(10) Patent No.: US 7,055,171 B1
(45) Date of Patent: May 30, 2006

(54) HIGHLY SECURE COMPUTER SYSTEM ARCHITECTURE FOR A HETEROGENEOUS CLIENT ENVIRONMENT

(75) Inventors: Robert P. Martin, Fort Collins, CO (US); Philip M. Walker, Fort Collins, CO (US); Gregory R. Allen, Fort Collins, CO (US); Mary Laser, Fort Collins, CO (US); John Marks, Fort Collins, CO (US); Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 969 days.

(21) Appl. No.: 09/678,933

(22) Filed: Oct. 4, 2000

Related U.S. Application Data (63) Continuation-in-part of application No. 09/584,252, filed on May 31, 2000.

(51) Int. Cl.
 *G06F 15/16* (2006.01)
 *H04L 12/66* (2006.01)

(52) U.S. Cl. ............... 726/3; 726/13; 726/15; 370/352; 370/353; 709/203; 709/217; 713/150; 713/153

(58) Field of Classification Search ............. 713/201; 370/395.21, 395.53, 399; 709/225
See application file for complete search history.

(56) References Cited

U.S. PATENT DOCUMENTS

| 5,432,785 | A | * | 7/1995 | Ahmed et al. ............. 370/231 |
| 5,920,699 | A | * | 7/1999 | Bare ........................... 709/225 |
| 5,968,126 | A | | 10/1999 | Ekstrom et al. |
| 5,968,176 | A | * | 10/1999 | Nessett et al. .............. 713/201 |
| 6,167,052 | A | * | 12/2000 | McNeill et al. ............. 370/399 |
| 6,414,958 | B1 | * | 7/2002 | Specht .................. 370/395.53 |
| 6,662,221 | B1 | * | 12/2003 | Gonda et al. ............... 709/223 |
| 6,701,432 | B1 | * | 3/2004 | Deng et al. ................. 713/153 |
| 6,717,913 | B1 | * | 4/2004 | Ghahremani et al. ....... 370/230 |
| 6,741,592 | B1 | * | 5/2004 | Edsall et al. ................ 709/225 |

FOREIGN PATENT DOCUMENTS

WO     WO 99/56436     11/1999

* cited by examiner

*Primary Examiner*—Kambiz Zand
*Assistant Examiner*—Abdulhakim Nobahar (57) ABSTRACT

A method of securely connecting a plurality of client computers to computer resources in a shared computer system by extending client network domains around computer resources in the shared computer system. The network domains of different clients remain isolated from one another in the shared computer system. The method includes associating each of the plurality of client computers with at least one virtual private network connection. The plurality of client computers are remotely connected to at least one virtual private network termination device in the shared computer system. The at least one virtual private network connection is established by the at least one virtual private network termination device. The at least one virtual private network connection is associated with a plurality of virtual local area networks. At least one of the computer resources in the shared computer system is associated with each of the plurality of virtual local area networks. Each of the client computers is thus securely connected to at least one of the computer resources in the shared computer system.

21 Claims, 4 Drawing Sheets

HIGHLY SECURE COMPUTER SYSTEM ARCHITECTURE FOR A HETEROGENEOUS CLIENT ENVIRONMENT

The present application is a continuation-in-part of U.S. patent application Ser. No. 09/584,252 filed May 31, 2000 for HIGHLY SECURE COMPUTER SYSTEM ARCHITECTURE FOR A HETEROGENEOUS CLIENT ENVIRONMENT of Robert P. Martin et al., which is hereby specifically incorporated by reference for all that is disclosed therein.

FIELD OF THE INVENTION

This invention relates to computer systems and more specifically to a secure computer system architecture for isolating heterogeneous client environments in the computer system.

BACKGROUND

Powerful computer systems and software applications have become an essential and critical resource for many tasks such as large engineering and design projects. For example, electronic design and analysis (EDA) applications running on powerful computer systems allow engineers to design, simulate, and debug electrical circuits and circuit boards which are extraordinarily complex. Mechanical design and analysis (MDA) applications similarly allow engineers to design complex and reliable devices. However, design and analysis applications require very powerful computer systems with a great deal of memory, and the licenses to use the applications are extremely expensive. The design and analysis applications are also finely divided according to function, requiring designers to purchase license for a large number of applications to complete an entire design project.

For example, an electrical engineering designer working on an electronic communication system may need to license individual EDA application's for system level design, system verification, cabling design and analysis, printed circuit board design, printed circuit board analysis, printed circuit board layout, integrated circuit design, integrated circuit timing simulators, etc, with different versions for digital, analog, and RF portions of the communication system. Therefore, designers may spend millions of dollars acquiring and maintaining licenses for the essential design and analysis applications, and hundreds of thousands of dollars for the computer systems to run the applications. Managing computer and application resources to meet fluctuating requirements is a never ending struggle for large engineering firms.

In order to reduce the cost of licensing the design and analysis applications, some application vendors offer session-based licenses rather than time-based licenses, so that the designer is not paying for the application when it is not being used. Unfortunately, the designer still needs to maintain the expensive computer systems to run the application, even though the system is unused or lightly used much of the time.

Application service providers (ASP's) provide computer processing capability and applications for clients on an as-needed basis. The ASP acquires and maintains a large computer system and software licenses, and clients may process their data on the ASP's computer system and software applications. For example, various ASP's may provide computer processing time and EDA applications, MDA applications, or other types of software as needed. The client can then either rely exclusively on the ASP to provide access to applications or can use the ASP to supplement their own resources during busy periods.

However, data security is of great concern to clients as they use ASP computer resources. Clients are typically concerned that other clients will be able to see, copy, or corrupt their data as it travels to or from or is processed on the ASP computer system. Clients may even process their data on the same ASP as their competitors, so data security is of utmost importance.

ASP's may protect client data by typical server environments which provide security through comprehensive access control lists, but they do not provide the physical isolation and encryption of the client data, nor do they provide the highest level of performance for many technical applications.

Consequently, a need exists for a highly secure computer system architecture for isolating heterogeneous client environments within the system.

SUMMARY

To assist in achieving the aforementioned needs, the inventors have devised a highly secure computer system architecture in which client environments may be allocated as needed and which are isolated from each other. Secure environments are configured in portions of the secure computer system according to client needs. Each clients secure environment is isolated from other clients environments. Clients may transfer data to and from the secure computer system across the Internet using a broadband or dial-up connection, or by direct connection, or by manual transportation of physical media as desired. Thus, the client's network domains are effectively extended to include computer resources in the highly secure computer system.

A configuration engine in the highly secure computer system associates clients with computer resources. The configuration engine preferably receives resource allocation requests from clients and automatically configures the highly secure computer system to connect clients with requested computer resources. Alternatively, the configuration engine has a graphical user interface allowing an operator to manually associate clients with resources.

The invention may comprise a method of securely connecting a plurality of client computers to computer resources in a shared computer system. The method includes associating each of the plurality of client computers with at least one virtual private network connection. The plurality of client computers are remotely connected to at least one virtual private network termination device in the shared computer system. The at least one virtual private network connection is established by the at least one virtual private network termination device. The at least one virtual private network connection is associated with a plurality of virtual local area networks. At least one of the computer resources in the shared computer system is associated with each of the plurality of virtual local area networks. Each of the client computers is thus securely connected to at least one of the computer resources in the shared computer system.

The invention may also comprise a secure computer system having a plurality of computers electrically connected to at least one virtual local area network switch. At least one virtual private network termination device is electrically connected to the at least one virtual local area network switch. The at least one virtual local area network switch is configurable to changeably connect a plurality of virtual private network connections in the at least one virtual private network termination device to at least one of the plurality of computers while isolating the plurality of virtual private network connections from one another. A configuration engine is electrically connected to the at least one virtual local area network switch. The configuration engine includes computer readable program code for configuring the at least one virtual local area network switch to changeably connect each of the plurality of virtual private network connections to at least one of the plurality of computers while isolating the plurality of virtual private network connections from one another.

The invention may also comprise a secure computer system having a plurality of computers and means for securely connecting each of a plurality of client computers to a portion of the plurality of computers while isolating the portion of the plurality of computers from a second portion of the plurality of computers.

BRIEF DESCRIPTION OF THE DRAWING

Illustrative and presently preferred embodiments of the invention are shown in the accompanying drawing, in which.

DESCRIPTION OF THE PREFERRED EMBODIMENT

The drawing and description, in general, disclose a method of securely connecting a plurality of client computers to computer resources in a shared computer system. The method includes associating each of the plurality of client computers with at least one virtual private network connection. The plurality of client computers are remotely connected to at least one virtual private network termination device in the shared computer system. The at least one virtual private network connection is established by the at least one virtual private network termination device. The at least one virtual private network connection is associated with a plurality of virtual local area networks. At least one of the computer resources in the shared computer system is associated with each of the plurality of virtual local area networks. Each of the client computers is thus securely connected to at least one of the computer resources in the shared computer system.

The drawing and description also disclose a secure computer system having a plurality of computers electrically connected to at least one virtual local area network switch. At least one virtual private network termination device is electrically connected to the at least one virtual local area network switch. The at least one virtual local area network switch is configurable to changeably connect a plurality of virtual private network connections in the at least one virtual private network termination device to at least one of the plurality of computers while isolating the plurality of virtual private network connections from one another. A configuration engine is electrically connected to the at least one virtual local area network switch. The configuration engine includes computer readable program code for configuring the at least one virtual local area network switch to changeably connect each of the plurality of virtual private network connections to at least one of the plurality of computers while isolating the plurality of virtual private network connections from one another.

The drawing and description also disclose a secure computer system having a plurality of computers and means for securely connecting each of a plurality of client computers to a portion of the plurality of computers while isolating the portion of the plurality of computers from a second portion of the plurality of computers.

A highly secure computer system 10 having multiple computer resources 12 may be used to provide various clients with concurrent access to computer resources such as data storage, data processing, or otherwise. For example, application service providers (ASPs) may use a highly secure computer system 10 to provide processor time and applications. Various client's computer systems 44, 46, and 50 may be connected to the highly secure computer system 10 by a broadband 14 or dial-up 16 connection across the Internet 20, or by a dedicated line 22, or by any other suitable data transmission means. A secure environment is established in the highly secure computer system 10 for each client, so that client data is protected from undesirable viewing, copying, or modification. The highly secure computer system 10 thus provides secure, accessible computer processing power and data storage for clients, reducing the cost of maintaining complex computer systems for the clients while ensuring that sufficient computer resources are available when needed.

The term client is used herein to refer to any computer system requiring access to computer resources in the highly secure computer system 10, such as independent computer systems or other highly secure computer systems 10. For example, several highly secure computer systems 10 may be linked together to balance processing loads.

Figure 1:
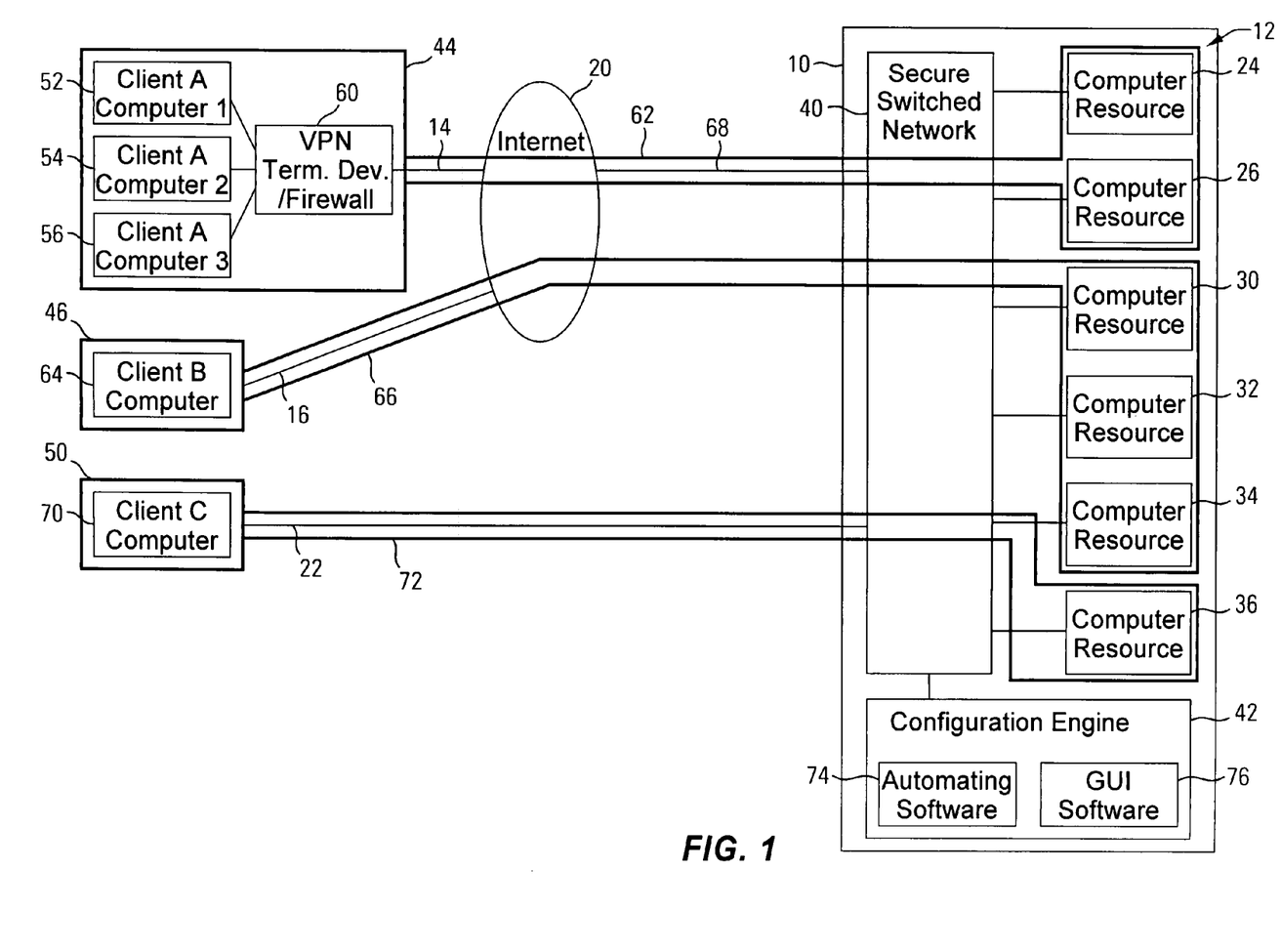
FIG. 1 is a diagram illustrating the concept of securely extending a client's network domain around computer resources in a highly secure computer system.

Referring now to FIG. 1, a highly secure computer system 10 includes a group of computer resources 12 such as computer processors (e.g., 24 and 26) or storage devices, a secure switched network 40, and a configuration engine 42. The computer resources 12 may be any type of electronic device which can be connected to a network, such as a network server, workstation, storage device, etc. The configuration engine 42 configures the secure switched network 40 to securely connect client computer systems 44, 46, and 50 to computer resources 12 as needed, while isolating each client's resources in the highly secure computer system 10 from one another. FIG. 1 illustrates the concept that the client's network domains 62, 66, and 72 are extended around computer resources 24 and 26, 30, 32, and 34, and 36, respectively. The client's network domains 62, 66, and 72 are isolated from one another inside the highly secure computer system 10.

In this exemplary conceptual diagram of the highly secure computer system 10, client A 44 has three local computers 52, 54, and 56 connected to the Internet 20 through a VPN termination device/firewall 60 across a broadband connection 14. The VPN termination device/firewall 60 may comprise a VPN capable router with a firewall. Two computer resources 24 and 26 in the highly secure computer system 10 are connected to client A 44 through the secure switched network 40. Client A's network domain 62 is thus effectively extended around the computers 24 and 26 in the highly secure computer system 10.

This also gives the computer resources 24 and 26 access to the client computer systems 52, 54, and 56. For example, if there are files to be processed on the client's computer systems 52, 54, and 56 by software on the computer resources 24 and 26 in the highly secure computer system 10, the computer resources 24 and 26 can access the files on the client's computer systems 52, 54, and 56 without necessarily copying them to the highly secure computer system 10.

Client B 46 has one local computer 64 connected to three computers 30, 32, and 34 in the highly secure computer system 10. The local computer 64 is connected to the secure switched network 40 across the Internet 20 using a dial-up connection 16, effectively extending client B's domain 66 around computers 30, 32, and 34 in the highly secure computer system 10. Client C 50 has one local computer 70 which is connected to one computer 36 in the highly secure computer system 10 across a dedicated line 22, such as a leased line. The local computer 70 is also connected through the secure switched network 40, effectively extending client C's domain 72 around the computer 70 in the highly secure computer system 10.

A configuration engine 42 in the highly secure computer system 10 configures the secure switched network 40 to securely connect the clients computer systems 44, 46, and 50 to computer resources 12 in the highly secure computer system 10. The configuration engine 42 preferably includes computer readable program code to be executed on a computer processor. The configuration engine 42 may include code 74 for automatically configuring the secure switched network 40 and code 76 providing a graphical user interface (GUI) for manual configuration of the secure switched network 40. The lowest level interface of the configuration engine 42 is preferably a very simple single function command to associate clients with computer resources in the highly secure computer system 10. The GUI code 76 and the automating code 74 thus need only execute the single function command to configure the secure switched network 40. (Although the single function command may need to be issued multiple times, each time connecting a port on a VLAN switch to a VLAN, as will be described hereinafter.) The automating code 74 in the configuration engine 42 may include load balancing systems or brokering systems which receive requests for computer resources 12 from clients and which automatically allocate resources 12 according to client need and priority, and resource availability.

The secure switched network 40, the configuration engine 42, and the computers 12 are preferably interconnected by a typical Ethernet with category 5 cables and Fast Ethernet network interface cards on the computers 12.

Figure 2:
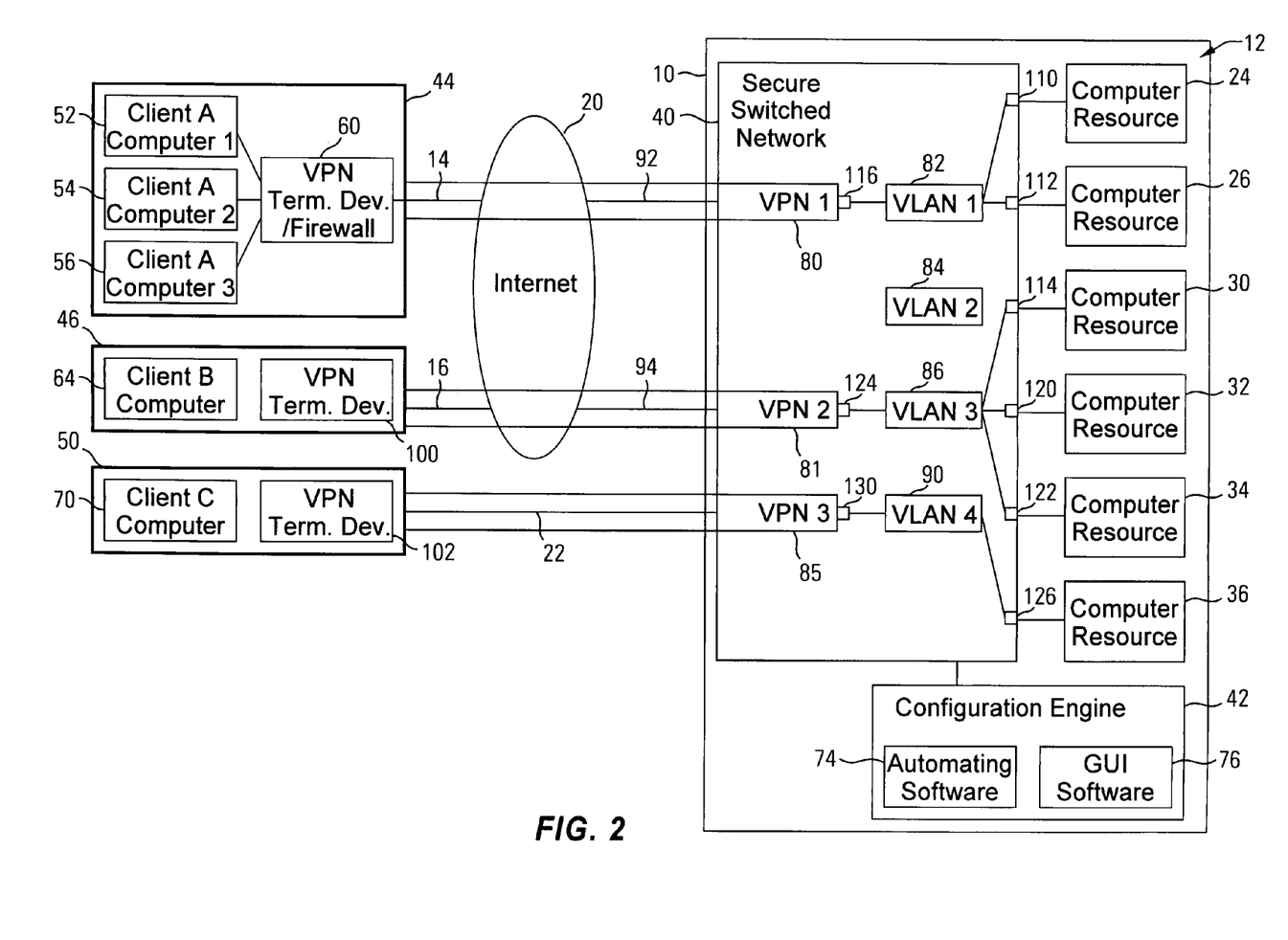
FIG. 2 is a diagram illustrating the concept of associating virtual private networks with virtual local area networks in the highly secure computer system of FIG. 1 to extend client's network domains.

FIG. 2 illustrates the interaction between virtual private networks (VPNs) and virtual local area networks (VLANs) in the highly secure computer system 10. The secure switched network 40 in the highly secure computer system 10 preferably includes at least one VPN termination device such as a VPN capable router. The VPN capable router establishes a group of VPNs 80, 81, and 85. The highly secure computer system 10 preferably also includes at least one VLAN capable connection device such as a switch. The VLAN switch establishes a group of VLANs 82, 84, 86, and 90. Each VPN is associated with specific VLANs to establish secure connections within the secure switched network 40.

It is important to note the difference between networks and network devices. Networks, such as the VPNs and VLANs discussed herein, are the connections between computer systems and resources. Network devices, such as the VPN termination devices (e.g., 80) and VLAN switches (e.g., 282, FIG. 3) are the devices which establish and support networks. Network devices are physical, while networks are logical.

The virtual private network router encrypts data traveling across the network, providing a secure connection during transmission. Examples of VPN termination devices include the Cisco 7140 VPN router, and the Cisco IntraPort 2+ VPN Access Server, available from Cisco Systems, Inc. of San Jose, Calif. VPN termination devices are particularly useful for Internet connections such as the broadband connection 14 and dial-up connection 16. Direct connections such as the dedicated line 22 preferably also use the VPN termination devices in the highly secure computer system 10, although it is not as critical with a dedicated line 22.

A VPN termination devices must be included at both ends of each link. For example, client A 44 includes a VPN termination device/firewall 60 which encrypts outgoing data and filters and decrypts incoming data. Client A 44 is connected to the highly secure computer system 10 over the Internet 20 on a broadband connection 14. The VPN termination device decrypts data coming from client A 44 and encrypts data going to client A 44 so that the data is secure as it travels over the Internet 20. Thus, if the data is intercepted or monitored, the client's data is secure. Similarly, client B 46 and client C 50 include VPN termination devices 100 and 102, respectively. VPN termination devices (e.g., 100 and 102) may comprises either hardware or software termination devices. For example, many standalone clients, such as client B 46 and client C 50, will be using software VPN termination devices, also known as "VPN clients." The VPN termination device in the highly secure computer system 10 uses a different encryption key for each VPN 80, 81, and 85 in the system. Thus, in the example shown in FIG. 2, three VPNs 80, 81, and 85 are in use, one for each client 44, 46, and 50, each having a different encryption key.

A virtual local area network (e.g., 82, 84, 86, and 90) may be implemented using many modern network switches such as the Catalyst series of network switches available from Cisco Systems, Inc. of San Jose, Calif. Such switches are described as "VLAN-capable." VLANs are typically used to limit network traffic to limited "broadcast domains" to improve performance. The VLANs 82, 84, 86, and 90 are secure and isolated sub-networks in the highly secure computer system 10. A VLAN switch associates address information on data packets with physical data ports on the VLAN switch. This enables the VLAN switch to direct data packets to the correct data port on the switch if the data packets are directed to an established VLAN (e.g., 82, 84, 86, and 90), or to discard data packets otherwise.

VLAN 1 82 connects computer resources 24 and 26 with VPN 1 80 to client A's computers 52, 54, and 56. (Note that there are several different, isolated VPN connections established by the VPN termination device, as discussed above.) VLAN 2 84 is unused in this example. VLAN 3 86 connects three computers 30, 32, and 34 with VPN 2 81 to client B 46. VLAN 4 90 connects one computer 36 with VPN 4 85 to client C 50.

Note that client C 50 is connected to the highly secure computer system 10 on a dedicated line 22 rather than over the Internet 20, but is connected through a VPN 85 to maximize security of client C's data in transit. In this example, two physical connections 92 and 94 exist between the Internet 20 and the highly secure computer system 10. Alternately, there may be any number of connections between the Internet 20 and the highly secure computer system 10 to provide redundancy and/or a given level of overall network throughput. Multiple VPN connections are thus carried over a single physical connection 68 to the Internet 20.

The VPNs 80, 81, and 85 and VLANs 82, 84, 86, and 90 form the basis for securely extending the client's network domains to include computer resources 12 in the highly secure computer system 10. Multiple VPNs and VLANs are established by one or more VPN termination devices and one or more VLAN switches as desired.

The VLANs 82, 84, 86, and 90 in the secure switched network 40 are configured by the configuration engine 42. An exemplary sequence of configuration commands is given below, using the simple single function command mentioned above. This sequence may be generated by the automating program code 74 or by a human administrator using the GUI code 76 in the configuration engine 42. The configuration commands configure the VLANs 82, 84, 86, and 90 to connect data ports so that information be transmitted between the ports recognized by the switch. Note that the ports can be physical ports (e.g., 110, 112, 114, 120, 122, and 126) located on the chassis of the VLAN switch or virtual ports (e.g., 116, 124, and 130) which are defined in the VLAN switch by ranges of address information on incoming data packets. As the VPN connections with clients are uniquely identified within the secure switched network 40, the VPN connections are effectively mapped to unique virtual ports on the VLAN switch. Thus, the sequence to achieve the connectivity in FIG. 2 could be:

Add port 110 to VLAN 1 82
Add port 112 to VLAN 1 82
Add port 116 to VLAN 1 82
Add port 114 to VLAN 3 86
Add port 120 to VLAN 3 86
Add port 122 to VLAN 3 86
Add port 124 to VLAN 3 86
Add port 126 to VLAN 4 90
Add port 130 to VLAN 4 90

More detail will be given with respect to FIG. 3 below about designating the ports in the configuration commands. Once this configuration is complete the various clients 44, 46, and 50 will have access to their assigned computer resources 12 through their VPN (e.g., 80, 81, and 85) and their VLAN (e.g., 82, 86, and 90) but they will have no visibility of each others activities or data. Only devices connected through a VLAN 82, 84, 86, or 90 can communicate. For example, computers 24, 26, and 30 can share data through VLAN 1 82 with each other and with client A 44, but no other clients (e.g., 46 and 50) or computer resources (e.g., 32, 34, and 36) will be able to communicate with the devices on VLAN 1 82.

In an alternative embodiment, the configuration engine 42 also configures the VPN termination device to set up the VPNs 80, 81, and 85 for each client, for example, setting up the encryption keys.

Note that it is simple to make additional computer resources 12 available to a client 44, 46, or 50 by adding them to that client's assigned VLAN 82, 86, or 90, respectively.

Note also that FIG. 2 shows only the connections configured by the configuration engine 42. Other physical connections in the highly secure computer system 10 are not shown, but will be easily understood by those skilled in the art. Logical connections can only be established where a physical connection exists. Thus, each VLAN preferably has a physical connection to each computer resource 12. Various network topologies may be used to establish these physical connections without departing from the inventive concepts disclosed herein, therefore no further detail on the physical network connections between the VLANs 82, 84, 86, and 90 will be given.

Figure 3:
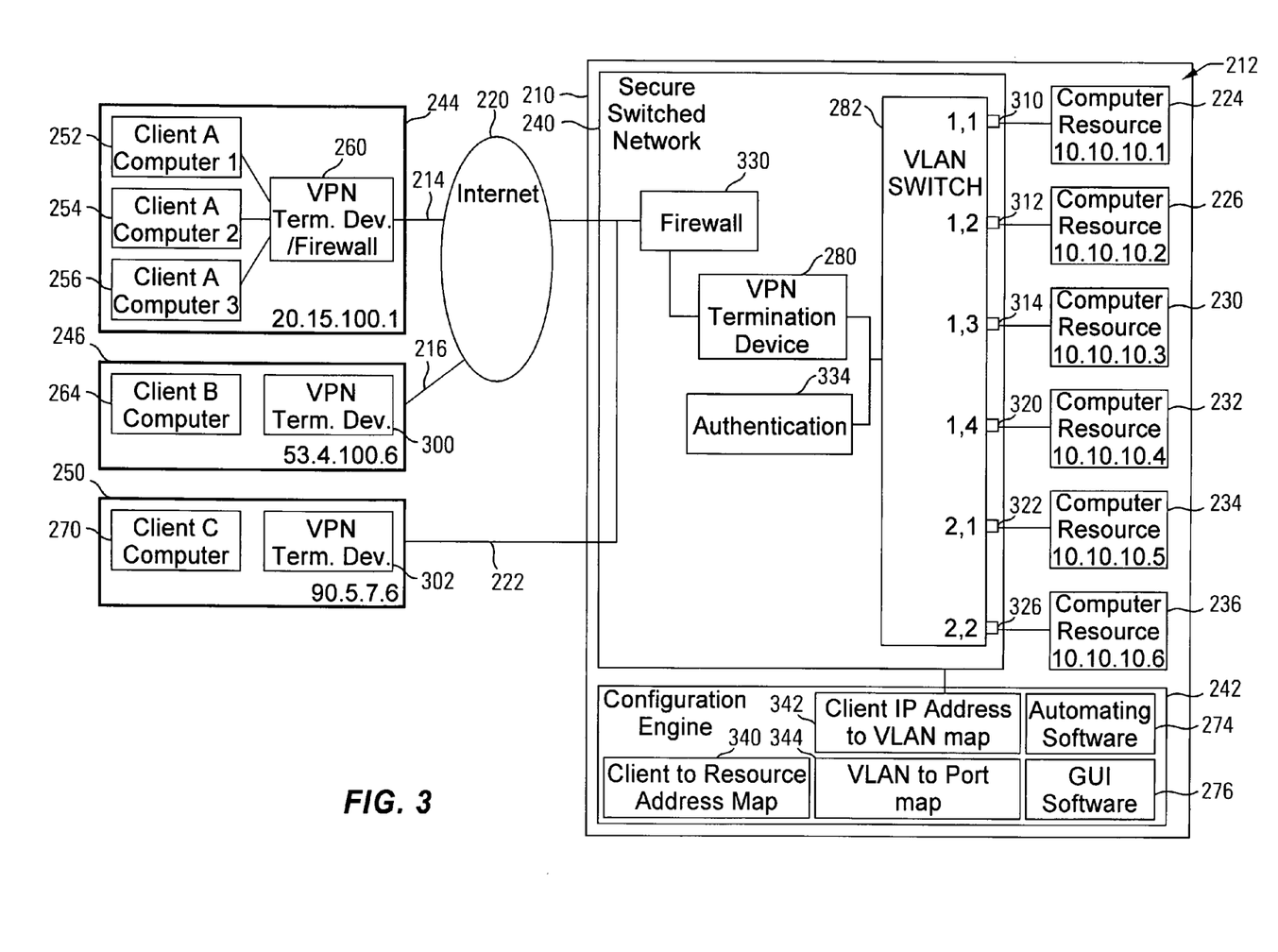
FIG. 3 is a diagram of a highly secure computer system including multiple virtual private network devices, a single virtual local area network switch, a configuration engine, a firewall and authentication software.

Referring now to FIG. 3, an exemplary embodiment of a highly secure computer system 210 will be described. As before in the conceptual descriptions, three clients are connected to the highly secure computer system 210. Client A 244 includes three computer systems 252, 254, and 256, connected to the highly secure computer system 210 through a VPN termination device/firewall 260 over the Internet 220 on a broadband connection 214. Client B 246 has a single computer system connected to the highly secure computer system 210 through a VPN termination device 300 over the Internet 220 on a dial-up connection 216. Client C 250 has a single computer system connected to the highly secure computer system 210 through a VPN termination device 302 on a dedicated line 222. Two physical data connections are shown entering the highly secure computer system 210, including the dedicated line 222 and the Internet connection. These could also be combined using a network device outside of the highly secure computer system 210, forming only one physical data connection to the highly secure computer system 210, or multiple inputs may be used.

A secure switched network 240 in the highly secure computer system 210 connects the clients 244, 246, and 250 to computer resources 212 in the highly secure computer system 210. Data from the clients 244, 246, and 250 first passes through a firewall 330 in the secure switched network 240. The firewall 330 performs the standard functions of a firewall at the perimeter of a secure site, rejecting unauthorized network traffic by filtering out or passing data according to a set of filtering rules configured by the system administrator.

Figure 4:
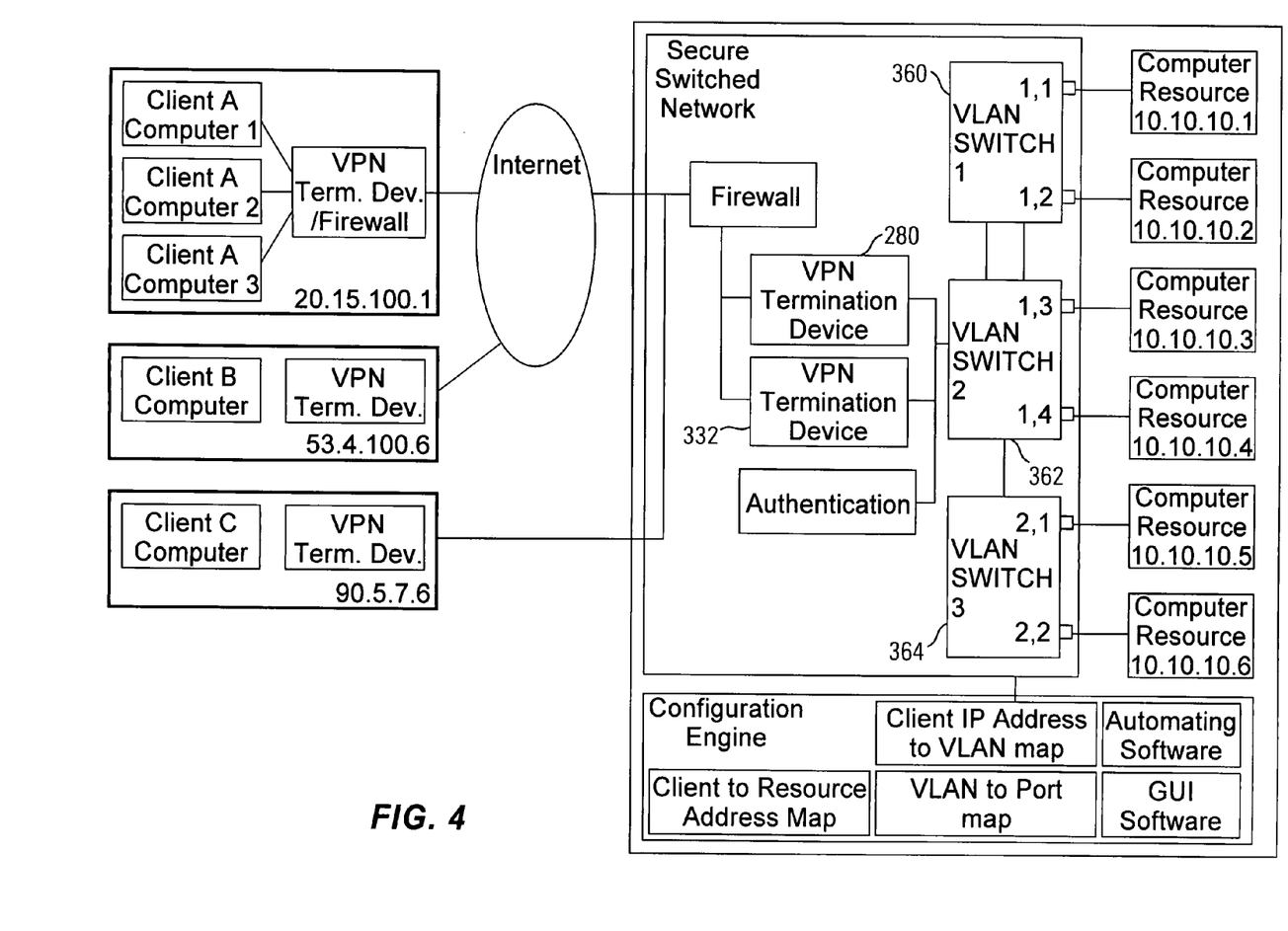
FIG. 4 is a diagram of a highly secure computer system including multiple virtual private network devices, multiple virtual local area network switches, a configuration engine, a firewall and authentication software.

After the firewall 330 at least one VPN termination device 280 is used to establish secure network connections with the remote client systems 252, 254, 256, 246, and 250. Each VPN connection is associated with one and only one client. VPN encryption functions may be included in routers, as in the exemplary embodiments herein, or in any other network devices. Note that multiple VPNs may all be processed by a single VPN termination device 280, as in FIG. 3, or the VPNs may be processed in multiple VPN termination devices 280 and 332, as in FIG. 4. Multiple VPN termination devices may be useful to service a variety of remote client systems, various types of security (e.g., multiple encryption algorithms) or performance needs.

An authentication function 334 is provided to verify the identity of the remote clients 244, 246, and 250 before the per-client VPN connections are established. The authentication function 334 verifies the identity of the clients 244, 246, and 250 before accepting data transfers from them, thereby preventing imposters from accessing private data. There are several commercially available solutions for this function including SafeWord™ software, available from Secure Computing Corporation of San Jose, Calif. This software may be executed on the same computer processor as a configuration engine 242, or on a separate computer processor. Alternatively, the authentication function 334 may be embodied in a dedicated hardware device. The VPN termination device 280 accesses the authentication function via a hardwired local area network (LAN) connection 336.

The VPN termination device 280 decrypts encrypted network traffic from the clients 244, 246, and 250 based on this authentication information. After this decryption resulting network traffic is examined by the VPN termination device 280 to verify that the specified destination IP address on the highly secure computer system 10 is valid for that specific client. Any IP address that doesn't pass this test is discarded. The mapping of clients 244, 246, and 250 to computer resource 12 IP addresses on the highly secure computer system 10 is maintained in a client to resource address map 340 in the configuration engine 242 and downloaded to the VPN termination device 280 when the mapping changes.

At least one VLAN-capable switch 282 uniquely associates ranges of address information, such as incoming IP addresses, with a particular VLAN (where each client has a unique VLAN). This association may also be based on address information placed in the headers of the data packets by the VPN termination device. Note that multiple VLANs may all be processed by a single VLAN switch 282, as in FIG. 3, or the VLANs may be processed in individual VLAN switches 360, 362, and 364, as in FIG. 4. The data associating incoming IP addresses with a particular VLAN is kept in a client address to VLAN map 342 that is downloaded over a secure link to the VLAN switch 282 whenever the associations are changed. In addition, that VLAN is uniquely associated with a list of physical ports 310, 312, 314, 320, 322, and 326 on the VLAN switch 282 which are each connected to a single computer resource 224, 226, 230, 232, 234, and 236, respectively. These associations are kept in a VLAN to port map 344 in the configuration engine 242 and downloaded to the VLAN switch 282 when any changes are made.

Therefore, since each client 244, 246, and 250 is uniquely associated with a VPN, that VPN is uniquely associated with a VLAN, that VLAN is uniquely associated with a set of physical ports 310, 312, 314, 320, 322, and 326 on the VLAN switch 282 and those physical ports 310, 312, 314, 320, 322, and 326 are uniquely associated with individual computer resources 224, 226, 230, 232, 234, and 236, the client 244, 246, or 250 is uniquely associated with those computer resources 224, 226, 230, 232, 234, and 236.

The three maps (client to resource address map 340, client address to VLAN map 342, and VLAN to port map 344) in the configuration engine 242 are updated by a common piece of software that ensures that the tables are synchronized to eliminate any connections between clients 244, 246, or 250 and computer resources 212 that are not meant to be connected. For example, each time a map 340, 342, or 344 changes, the common software may verify each connection in the secure switched network 240 according to the maps 340, 342, and 344, removing unwanted connections that may be left over from previous configurations.

Alternatively, the common software may remove all connections in the secure switched network 240 and reconfigure the entire secure switched network 240 each time a map 340, 342, or 344 changes. However, this may cause disruptions to network traffic for clients whose computer resources 212 were not changed in the maps 340, 342, and 344.

The contents of the three maps 340, 342, and 344 in the configuration engine 242 are displayed in tables below, assuming the IP addresses shown in FIG. 3. Note this is only one exemplary way the information could be organized—many others are possible. The first table contains the client to resource address map 340, which specifies the mapping of clients (e.g., 244, 246, and 250) to computer resources 212 in the highly secure computer system 210. It is possible that a given computer resource (e.g., 212) may not be mapped to any client 244, 246, or 250 at a given time.

| Resource IP Address | Client IP Address |
| --- | --- |
| 10.10.10.1 | 20.15.100.1 |
| 10.10.10.2 | 20.15.100.1 |
| 10.10.10.3 | 20.15.100.1 |
| 10.10.10.4 | 53.4.100.6 |
| 10.10.10.5 | 53.4.100.6 |
| 10.10.10.6 | 90.5.7.6 |

The second table contains the client address to VLAN map 342, which specifies the mapping of VLAN number to client IP address. An example is shown below for the configuration shown in FIG. 2. Note that VLAN 2 is not assigned to any client 44, 46, or 50 at this time.

| VLAN Number | Client IP Address |
| --- | --- |
| 1 | 20.15.100.1 |
| 2 | |
| 3 | 53.4.100.6 |
| 4 | 90.5.7.6 |

While the client IP address is used in this example to uniquely identify the client system or systems, other techniques such as unique client identification numbers can serve this same purpose in the first two tables.

The third table contains the VLAN to port map 344, which specifies the mapping of the VLAN to physical ports on the VLAN switch 282. These ports might be specified is as a "blade" number and port on that blade, for example. In this example we assume the VLAN switch 282 supports two "blades" with 4 physical ports each. The computer resources 212 are connected to the physical ports as shown in FIG. 3.

| Physical Port | VLAN |
| --- | --- |
| 1, 1 | 1 |
| 1, 2 | 1 |
| 1, 3 | 1 |
| 1, 4 | 3 |
| 2, 1 | 3 |
| 2, 2 | 4 |
| 2, 3 | |
| 2, 4 | |

It is possible to represent this tabular data in many ways, or even combine the mappings into a single table. It is show here in three maps for clarity.

The highly secure computer system 10 and 210 described herein provides clients with a safe, convenient system for using shared computer resources. Each client is provided with a secure computer environment which can be initialized and configured according to the client's needs, in hardware, software, and operating system.

The highly secure computer system 10 and 210 also provides a safe and convenient way for a client to provide third party access to the client's data. If the client needs a third party to work on the client's data, both the client and the third party may be connected to the client's computer resources 12 and 212 in the highly secure computer system 10 and 210. For example, in a joint development project two remote clients may access the same client data in the secure computer system 10 and 210. A client may also need help debugging an EDA project. In this case, the software engineers who programmed the EDA software can be given access to the client's data so that they can debug the project in the actual working environment.

To provide this third party access, both the client's VPN and the third party's VPN are connected to the client's VLAN, as described above.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of securely connecting a plurality of client computers to computer resources in a shared computer system, comprising:

associating each of said plurality of client computers with at least one virtual private network connection, wherein said plurality of client computers are remotely connected to at least one virtual private network termination device in said shared computer system, said shared computer system comprising an application service provider, and wherein said at least one virtual private network connection is established by said at least one virtual private network termination device;

associating said at least one virtual private network connections with a plurality of virtual local area networks; and associating at least one of said computer resources in said shared computer system with each of said plurality of virtual local area networks, whereby a domain for each of said plurality of client computers is extended to include said computer resources in said application service provider and said plurality of client computer domains are isolated from each other within said application service provider.

2. The method of claim 1, wherein each of said at least one virtual private network connections is uniquely associated with one of said plurality of virtual local area networks, so that a one to one correspondence exists between said at least one virtual private network connection and said plurality of virtual local area networks.

3. The method of claim 1, wherein a plurality of said at least one virtual private network connections is uniquely associated with one of said plurality of virtual local area networks.

4. The method of claim 1, further comprising a configuration engine in said shared computer system configuring at least one virtual local area network switch to establish said plurality of virtual local area networks.

5. The method of claim 1, further comprising a configuration engine in said shared computer system configuring said at least one virtual private network termination device to establish said at least one virtual private network connection.

6. The method of claim 4, further comprising said configuration engine reading computer requirements from at least one client.

7. The method of claim 6, further comprising said configuration engine calculating an optimum allocation of said plurality of computer resources to meet said computer requirements of said at least one client.

8. The method of claim 4, further comprising said configuration engine configuring said at least one virtual local area network switch to connect at least two of said plurality of client computers to a same one of said plurality of virtual local area networks.

9. The method of claim 1, wherein at least one of said plurality of client computers is connected to said shared computer system across a dedicated line.

10. The method of claim 1, wherein at least one of said plurality of client computers is connected to said shared computer system across the Internet.

11. The method of claim 10, wherein at least one of said plurality of client computers is connected to said shared computer system with a modem.

12. The method of claim 10, wherein at least one of said plurality of client computers is connected to said shared computer system with a broadband connection.

13. The method of claim 1, said shared computer system further comprising computer readable program code for authenticating client computer identification, said method further comprising executing said computer readable program code to authenticate client computer identification before associating each of said plurality of client computers with at least one virtual private network connection.

14. The method of claim 1, said shared computer system further comprising at least one firewall, said method further comprising configuring said at least one firewall to accept data from each of said plurality of client computers.

15. The method of claim 14, further comprising a configuration engine in said shared computer system configuring said at least one firewall to accept data from each of said plurality of client computers.

16. A secure computer system, comprising;
a plurality of computer resources;
at least one virtual local area network switch electrically connected to said plurality of computer resources;
at least one virtual private network termination device electrically connected to said at least one virtual local area network switch, wherein said at least one virtual local area network switch is configurable to changeably connect a plurality of virtual private network connections in said at least one virtual private network termination device to at least one of said plurality of computer resources while isolating said plurality of virtual private network connections from one another; and
a configuration engine electrically connected to said at least one virtual local area network switch, said configuration engine comprising computer readable program code for configuring said at least one virtual local area network switch to changeably connect each of said plurality of virtual private network connections to at least one of said plurality of computer resources while isolating said plurality of virtual private network connections from one another.

17. The secure computer system of claim 16, wherein said computer readable program code in said configuration engine further comprises code for a graphical user interface to manually configure said virtual local area network switch.

18. The secure computer system of claim 16, wherein said computer readable program code in said configuration engine further comprises code for automatically configuring said virtual local area network switch.

19. The secure computer system of claim 16, wherein said computer readable program code in said configuration engine further comprises code for reading client computer requirements across said plurality of virtual private network connections.

20. The secure computer system of claim 16, further comprising at least one firewall connected to said plurality of virtual private network connections.

21. The secure computer system of claim 16, further comprising computer readable program code for authenticating identification of client computers connected to said plurality of virtual private network connections.

* * * * *